Patented June 24, 1930

1,765,535

UNITED STATES PATENT OFFICE

LOUIS CLEVELAND JONES, OF GREENWICH, CONNECTICUT, ASSIGNOR TO CHEMICAL ENGINEERING CORPORATION, OF NEW YORK N. Y., A CORPORATION OF DELAWARE

METHOD OF PRODUCING HYDROGEN-NITROGEN MIXTURE IN THE MANUFACTURE OF SYNTHETIC AMMONIA

No Drawing.   Application filed October 28, 1925. Serial No. 65,495.

In the production of synthetic ammonia one of the most important phases of the process and one representing considerably over one-half of the expense in such ammonia manufacture is the production of a proper mixture of 3 volumes of hydrogen and 1 volume of nitrogen. In the art as practiced today, this mixture has been satisfactorily prepared from electrolytic hydrogen and atmospheric nitrogen in which the hydrogen has been secured from electrolytic oxygen-hydrogen cells or from electrolytic caustic chlorine cells; while the nitrogen of atmospheric origin has been obtained either by burning the air with hydrogen leaving nitrogen, or by rectification of liquid air with the elimination and discarding of the oxygen.

Satisfactory gas mixtures for producing ammonia have also been made from water gas wherein carbon monoxide of the water gas, representing usually 40 to 50% by volume of water gas as produced, has been converted into hydrogen by the reduction of steam yielding a volume of hydrogen and a volume of $CO_2$ for each volume of carbon monoxide reacting. This method, known as the Haber-Bosch method of obtaining hydrogen from water gas, is normally carried out with a contact catalyst at temperatures ranging from 325° C. to 450° C.

I have discovered that the required hydrogen-nitrogen mixture for the synthesis of ammonia can be very satisfactorily prepared from a source of gas now considered waste, or at least a by-product, and which heretofore has never been utilized for the manufacture of hydrogen-nitrogen mixture for producing synthetic ammonia.

This gas is the impure carbon monoxide obtained as a by-product from the production of calcium carbide and of metallic aluminum. My invention in its broadest aspect is predicated upon the production of hydrogen-nitrogen mixture in predetermined ratio suitable for ammonia manufacture from (85% up to 100%) carbon monoxide regardless of the source of the carbon monoxide so used. These two examples, the manufacture of metallic aluminum and also of calcium carbide, are given to explain the processes illustrating and disclosing the invention, but I do not wish my improved methods to be restricted to these two examples, since my process is adapted to any source of carbon monoxide from any reaction known in the art by which a gas having carbon monoxide as its major constituent is given off.

In practicing my invention I first collect the carbon monoxide in any practical, suitable way whereby a minimum of air is allowed to mix with the carbon monoxide during the collection process. All the air to be used as a source of nitrogen is reacted with the carbon monoxide, as explained later, and should be controlled in amount so as to produce the necessary 3 to 1 hydrogen-nitrogen mixture. Any air in the carbon monoxide as a result of unavoidable contamination, if small in amount, does not adversely affect the working of my process, and at the same time is in no way objectionable; however the collection devices are purposely designed to take the carbon monoxide off the apparatus producing same in as pure a manner as possible.

The collected gas is then freed from dust and passes to any suitable catalytic apparatus where it is preferably contacted with two separate bodies of a suitable catalyst, such as oxides of iron or chromium or a mixture of same, in the presence of air and of from two to ten volumes of steam at a temperature from 325° C. to 500° C., with provision for this mixture to travel over the first body of catalyst and then by series to flow over the second body of catalyst. The equilibrium and completion of the reaction are hastened by removing in any suitable manner a proper portion of the carbon dioxide formed after the gas mixture has passed into contact with the first body of catalyst and before such mixture comes into reacting contact with the second catalyst. Additional steam may be added to the gaseous mixture between the gaseous contacts with each body of the catalyst, and further an additional amount of air may be introduced and burned in the gaseous mixture during its passage from the first body of catalyst to the second. The products of this reaction now consist of excess steam which is condensed out, and the remaining gas which has approximately the following composition:

| | Per cent |
|---|---|
| Nitrogen | 14 |
| Hydrogen | 42 |
| Carbon dioxide | 42 |
| Carbon monoxide | 2 |
| | 100 |

While my process is capable of considerable variation, it is based upon the following reaction:

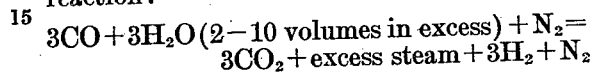

The above reaction in contact with a suitable oxidation catalyst such as I have mentioned generates and gives off considerable heat, and this heat may be controlled by the use of a greater excess of steam than that given above, the actual amount depending on the amount of heat lost by radiation and carried out by the reacting gases and accounted for in the latent heat of steam used. In actual practice a proper temperature control may be secured either by suitable regulation of the steam introduced, or by controlling the saturation of the ingoing gases with water to be converted into steam.

I wish it to be understood that the foregoing example is only one practical method of carrying out my invention; the details may be widely varied in many ways without departing from the scope of the invention or sacrificing the advantages derived from its use.

I claim as my invention:

1. In the production of hydrogen-nitrogen mixture for ammonia synthesis, the step which consists in passing a gas having carbon monoxide as its major constituent in the presence of air and of an excess amount of steam over a series of active oxidation catalysts at a temperature from 325° C. to 500° C. resulting in the following reaction:—

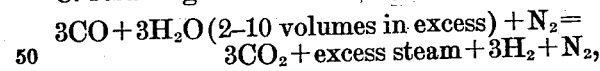

while removing a part only of the carbon dioxide formed in the reaction from the residual gaseous mixture during its passage between catalysts and meanwhile adding steam and air thereto.

2. The method of producing hydrogen-nitrogen mixture in predetermined ratio for ammonia synthesis which comprises passing a gas having carbon monoxide as its major constituent in contact with an oxidation catalyst in the presence of air and of two to ten volumes of steam at a temperature of about 500° C., removing a part only of the carbon dioxide formed in the reaction, and then passing the residual gas mixture while adding steam and air thereto into reacting contact with another oxidation catalyst.

3. The method of producing hydrogen-nitrogen mixture in predetermined ratio for ammonia synthesis which comprises passing a gas having carbon monoxide as its major constituent in contact with an oxidation catalyst in the presence of air and of two to ten volumes of steam at a temperature from 325° C. to 500° C., removing a part only of the carbon dioxide formed in the reaction, and then passing the residual gas mixture while adding steam and air thereto into reacting contact with another oxidation catalyst.

4. The method of producing hydrogen-nitrogen mixture in predetermined ratio for ammonia synthesis which comprises passing a gas having carbon monoxide as its major constituent in contact with an oxidation catalyst in the presence of air and of two to ten volumes of steam at a temperature of about 500° C., removing a part only of the carbon dioxide formed in the reaction, simultaneously adding air to the residual gaseous mixture and passing same into reacting contact with another oxidation catalyst, and condensing any excess steam from the resulting reaction products.

5. The method of producing hydrogen-nitrogen mixture in predetermined ratio for ammonia synthesis which comprises passing a gas having carbon monoxide as its major constituent in contact with an oxidation catalyst in the presence of air and of two to ten volumes of steam at a temperature of about 500° C., removing a part only of the carbon dioxide formed in the reaction, simultaneously adding air to the residual gaseous mixture and passing same into reacting contact with another oxidation catalyst while adding excess steam to maintain the temperature of reaction below 500° C., and condensing any excess steam from the resulting reaction products.

LOUIS CLEVELAND JONES.